United States Patent [19]

Koenig et al.

[11] Patent Number: 5,562,567

[45] Date of Patent: Oct. 8, 1996

[54] SHIFT TORQUE MANAGEMENT

[75] Inventors: Melissa M. Koenig, Ann Arbor; William J. Vukovich, Ypsilanti, both of Mich.

[73] Assignee: General Motors Corporation, Detroit, Mich.

[21] Appl. No.: 497,167

[22] Filed: Jun. 30, 1995

[51] Int. Cl.$^6$ ................................................ B60K 41/10
[52] U.S. Cl. .............................. 477/54; 477/61; 477/109
[58] Field of Search ................................ 477/54, 61, 109

[56] References Cited

U.S. PATENT DOCUMENTS

| | | | |
|---|---|---|---|
| 5,103,692 | 4/1992 | Shimanaka et al. | 477/109 |
| 5,133,227 | 7/1992 | Iwatsuki | 477/109 |
| 5,292,288 | 3/1994 | Kashiwabara et al. | 477/61 |
| 5,295,415 | 3/1994 | Abe et al. | 477/109 |
| 5,305,213 | 4/1994 | Boardman et al. | 477/109 |
| 5,403,245 | 4/1995 | Watanabe et al. | 477/54 |
| 5,476,425 | 12/1995 | Shiraishi et al. | 477/109 |

*Primary Examiner*—Dirk Wright
*Attorney, Agent, or Firm*—Vincent A. Cichosz

[57] ABSTRACT

A motor vehicle having an automatic transmission coupled to an internal combustion engine includes computer based control of powertrain functions including engine torque management and ratio change controls. Shift pressure is scheduled off of the total torque to be transferred to the on-coming friction element, estimated as a function of transmission input torque and powertrain inertia torque constituents. Engine torque during a shift is reduced in a manner which accounts for the relative contributions of transmission input torque and inertia torque constituents of shift torque in order to arrive at a predetermined target shift torque regardless of the proportion mix of the torque constituents.

5 Claims, 3 Drawing Sheets

SHIFT TORQUE MANAGEMENT

BACKGROUND

This invention is related to automotive powertrain systems including computer control of various engine and automatic transmission functions. More specifically, the invention is concerned with control of torque during ratio changes of the automatic transmission.

Generally, it is desirable to perform ratio changes in an automatic transmission such that the total shift time remains within a predetermined range to provide for consistent quality shift feel. Shifts of longer and shorter durations may result in excessive wear of torque transmitting friction devices and undesirably harsh shift feel, respectively, as well as other undesirable effects. A major factor affecting shift duration is the torque at the friction device being applied (shift torque) which may vary significantly in accordance with such performance demands as acceleration and vehicle loading due to concomitant increases in engine torque. Known powertrain control systems seek to equalize the diverse shift torques to a target shift torque during ratio changes at these various performance demands by reducing the engine torque to a predetermined level. The resultant shift torque is utilized to set the shift pressure for use during the shift, which pressure in turn establishes the shift duration.

However, other factors not related to performance demands may affect the stability of the shift times. Barometric pressure for example may significantly affect the engine torque produced at a given throttle setting. Also, different shift schedules, for example for performance and economy shift points, may affect the shift torque. These factors, among others, may affect the proportional balance among various torque constituents comprising shift torque. Therefore, a constant percentage reduction in engine torque for a given shift torque still may result in very different shift torques at certain operating conditions.

SUMMARY

Therefore, the present invention seeks to address the potential variability in shift torque at diverse operating conditions by determining—for the present operating conditions, and regardless of the proportional balance of torque constituents comprising shift torque—the amount of engine torque reduction necessary to effectuate a predetermined target shift torque, and reducing the engine torque by that amount during the ratio change. This may be accomplished by calculating the transmission input torque and inertia torque at a time substantially contemporaneous with the start of a shift, which torques comprise the torque constituents of the present shift torque. Next, an amount of shift torque reduction is determined—either as a value representing torque or as a percentage of the shift torque—that will result in a predetermined target shift torque. The percent engine torque reduction is next calculated as the ratio of the shift torque reduction to the transmission input torque where the shift torque reduction was determined as a value representing torque, or by multiplying the shift torque reduction by the ratio of uncorrected shift torque to the input torque. Either of the above alternative techniques will return the same percent engine torque reduction. Finally, the engine torque itself is reduced by the percent engine torque reduction to thereby establish a corrected shift torque substantially equivalent to the target shift torque.

DETAILED DESCRIPTION

Figure 1:
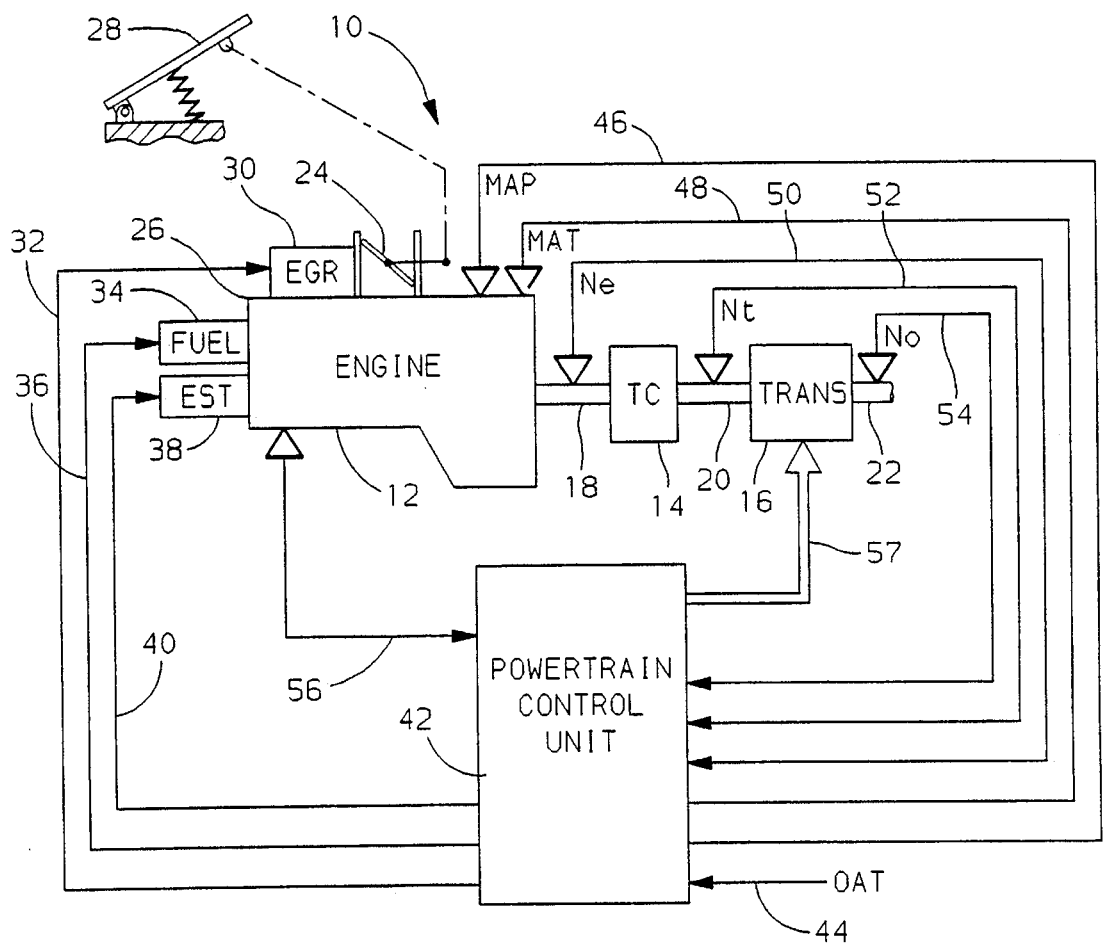
FIG. 1 is a schematic illustration of a computer controlled powertrain system for implementing the shift torque control of the present invention.

Referring to FIG. 1, the reference numeral 10 generally designates a motor vehicle drivetrain comprising a spark ignition internal combustion engine (ENGINE) 12, a fluidic torque converter (TC) 14 and a conventional hydraulic automatic transmission (TRANS) 16. The engine output shaft 18 drives the input member (impeller) of torque converter 14, the output member (turbine) of torque converter 14 drives the transmission input shaft 20, and the transmission output shaft 22 drives the vehicle wheels for propelling the vehicle.

A throttle 24 controls the ingestion of combustion air through the engine intake manifold, schematically designated by the reference numeral 26. The throttle 24 is positioned in a conventional manner by an operator manipulated accelerator pedal 28, as indicated. An exhaust gas recirculation (EGR) actuator 30 additionally returns a controlled amount of the exhaust gases to the manifold 26 in accordance with an EGR control signal on line 32. Engine fueling is controlled by a conventional fuel injection apparatus generally designated by the reference numeral 34 in accordance with a fuel pulse width signal on line 36.

The engine ignition function is carried out with a conventional spark ignition system (not illustrated) which cooperates with a conventional electronic spark timing (EST) unit 38 to initiate combustion in the various engine cylinders in accordance with a predetermined schedule. The EST unit 38 typically schedules the spark timing as a predetermined function of engine speed and manifold absolute pressure (MAP), and modifies the scheduled timing in accordance with spark retard commands, if any, present on line 40.

The EGR control signal, the fuel pulse width signal, and the spark timing signal are generated by a computer based powertrain control unit 42 in a predetermined manner in accordance with various operating parameters of the drivetrain 10. Such parameters are sensed with conventional transducers and provided as inputs to control unit 42 via lines 44–56. The sensed parameters include the outside air temperature (OAT) on line 44, the manifold absolute pressure (MAP) on line 46, the manifold air temperature (MAT) on line 48, the engine speed (Ne) on line 50, the torque converter output (turbine) speed (Nt) on line 52, the transmission output shaft (No) on line 54, and the engine coolant temperature (Ct) on line 56. The control unit 42 may be mechanized with a conventional state-of-the-art microcomputer controller, including a central processing unit, memory and input/output devices.

Transmission 16 has a plurality of conventional fluid operated friction devices for engaging various gear elements to provide for a variety of ratios generally characterized by the ratio of the turbine speed Nt to transmission output shaft speed No, or Nt/No. A controlled shift pressure for sourcing pressurized fluid to the various friction devices is typically established by a solenoid controlled fluid valve (force motor) in accordance with a pulse width signal. The same force motor is typically responsible for establishing the line pressure level also. References to establishing line pressure and shift pressure, therefor, may be interchangeably used herein. Fluid pressures for the various friction devices are typically established by solenoid controlled fluid valves (shift valves) in accordance with the supplied shift pressure and other hydraulic devices such as accumulators and restrictors. The various solenoid control signals, generally designated by the numeral 57 in the illustration, are also generated by the powertrain control unit 42 in a predetermined manner in accordance with various operating parameters of the drivetrain 10.

Figure 2A:
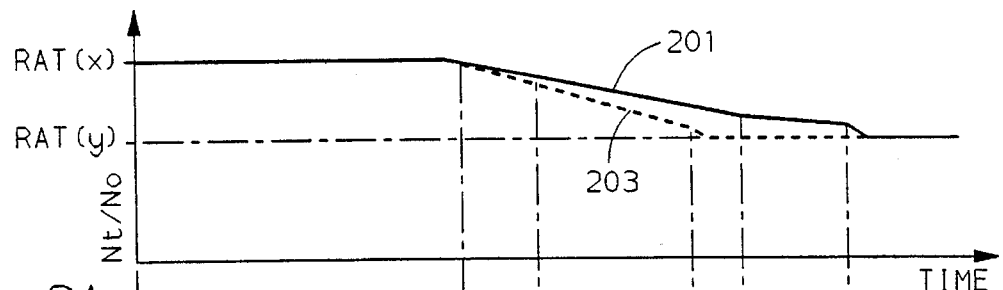
FIG. 2A and 2B illustrate a typical ratio change with conventional shift torque control and with the shift torque control of the present invention in accordance with a preferred implementation.
Figure 2B:
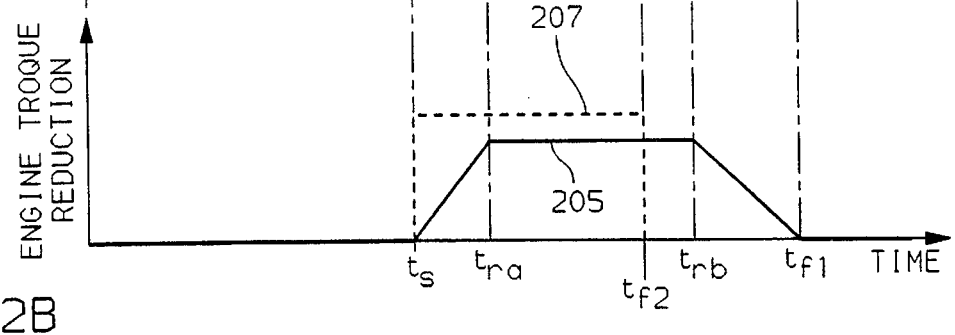

FIGS. 2A is generally illustrative of a ratio change (upshift) from one ratio RAT(x) to a lower ratio RAT(y). The ratio (vertical axis) measured as the turbine speed to output shaft speed ratio, Nt/No, provides a measure of the shift progression over time (horizontal axis). FIG. 2B is generally illustrative of engine torque control during a ratio change as illustrated in FIG. 2A. Engine torque reduction (vertical axis) is plotted against the same time scale (horizontal axis) as shown in FIG. 2A. In each of the various figures, where both solid and dashed traces are shown, the dashed traces correspond to a shift effected with conventional shift torque control, while the solid traces correspond to a shift effected with the shift control of the present invention.

As indicated above, shift torque (STQ) comprises various torque constituents which may be represented by the general relationship:

$$STQ = ETQ*TQRAT + ITQ \quad (1)$$

where ETQ represents engine output torque determined as a function of various factors including MAP, engine pumping efficiency and mechanical friction; TQRAT represents an engine torque gain due to the torque converter operating conditions determined as a function of the speed ratio Nt/Ne, and ITQ represents the inertia torques of various input side rotating members determined as a function of Nt. TQRAT preferably will include, in addition to the torque converter gain, any ratio altering mechanization coupling the engine output shaft and transmission input shaft, for example chain and sprocket drives as conventionally found in front wheel drive vehicles. ITQ preferably will include, in addition to inertias of input side transmission members, engine inertia gained appropriately. The combined term ETQ*TQRAT represents the transmission input torque.

Referring again to FIGS. 2A and 2B, a desired shift time is defined by the duration between start time $t_s$ and finish time $t_{fl}$. Shift start time and finish time are defined by respective event based thresholds such as predetermined ratio thresholds or timer thresholds. In the present example for instance it is assumed that start time $t_s$ corresponds to the ratio Nt/No having reached a first predetermined value related to the first ratio RAT(x), for example a value equivalent to 90% of RAT(x). Alternatively, start time $t_s$ may correspond to the expiration of a predetermined amount of time from shift initiation. Both traces 201 and 203 represent an upshift which at the time of initiation are characterized by equivalent shift torques. However, both traces 201 and 203 correspond to a proportional mix of input torque (ETQ*TQRAT) and inertia torque (ITQ) making up shift torque (STQ) that differs from a mix associated with baseline calibration conditions, for example barometric pressure equal to one atmosphere. Assuming that the proportional mix is weighted more heavily toward input torque, an uncorrected percentage reduction of ETQ based upon the shift torque STQ as conventionally practiced is invoked at start time $t_s$ as illustrated in FIG. 2B (dashed line 207). The shift progresses until the ratio Nt/No reaches a second predetermined value related to the second ratio RAT(y), for example a value equivalent to 110% of RAT(y), whereafter further reduction of ETQ cease and the final ratio RAT(y) is achieved. This point corresponds to the shift finish time labeled $t_{f2}$. It is noted here that the shift time corresponding to the shift represented by trace 203 ($t_f$ through $t_{f2}$) is undesirably of lesser duration than the desired shift time ($t_s$ through $t_{fl}$). The conventional engine torque reduction control applies the same reduction (207) regardless of the proportional mix of input torque and inertia torque. Therefore, the percent engine torque reduction results in a resultant shift torque less than a target shift torque, which desired shift torque would result in a shift of desired duration. The shift pressure, being scheduled off of the shift torque existing at the start of the shift, while appropriate for the target shift torque is disproportionate for the resultant shift torque and results in the shortened shift time.

On the other hand, the control of the present invention is responsive to the proportional constitution of shift torque STQ and appropriately adjusts the engine torque reduction to provide a resultant shift torque consistent with the target shift torque. By examining the solid traces 201 and 205 as they represent a shift performed under the present control, it is seen that the shift progresses from start time $t_s$ through finish time $t_{fl}$—the desired shift duration. This is accomplished by weighting the uncorrected percentage reduction of ETQ which is based upon the shift torque STQ to account for variations in the shift torque constitution. This is exemplified in the engine torque reduction trace 205 which is obviously less than the uncorrected engine torque reduction exemplified by trace 207. It should be apparent from study of FIG. 2B that the application of the engine torque reduction also differs inasmuch as the reduction is ramped in at the start of the shift between start time $t_s$ and ramp time $t_{ra}$, and ramped out toward the end of the shift between ramp times $t_{rb}$ and finish time $t_f$. In a preferred implementation, the engine torque reduction is applied from zero to a maximum percentage as a function of ratio progression. Likewise, the engine torque reduction is ramped out from the maximum percentage to zero also as a function of ratio progression. Alternatively, ramp in and out may be implemented as a function of time progression through the shift or at rates as a function of a measure of throttle position, lower throttle positions—where swift application may be objectionably discernible by the vehicle operator—being associated generally with lower rates of application.

Figure 3:
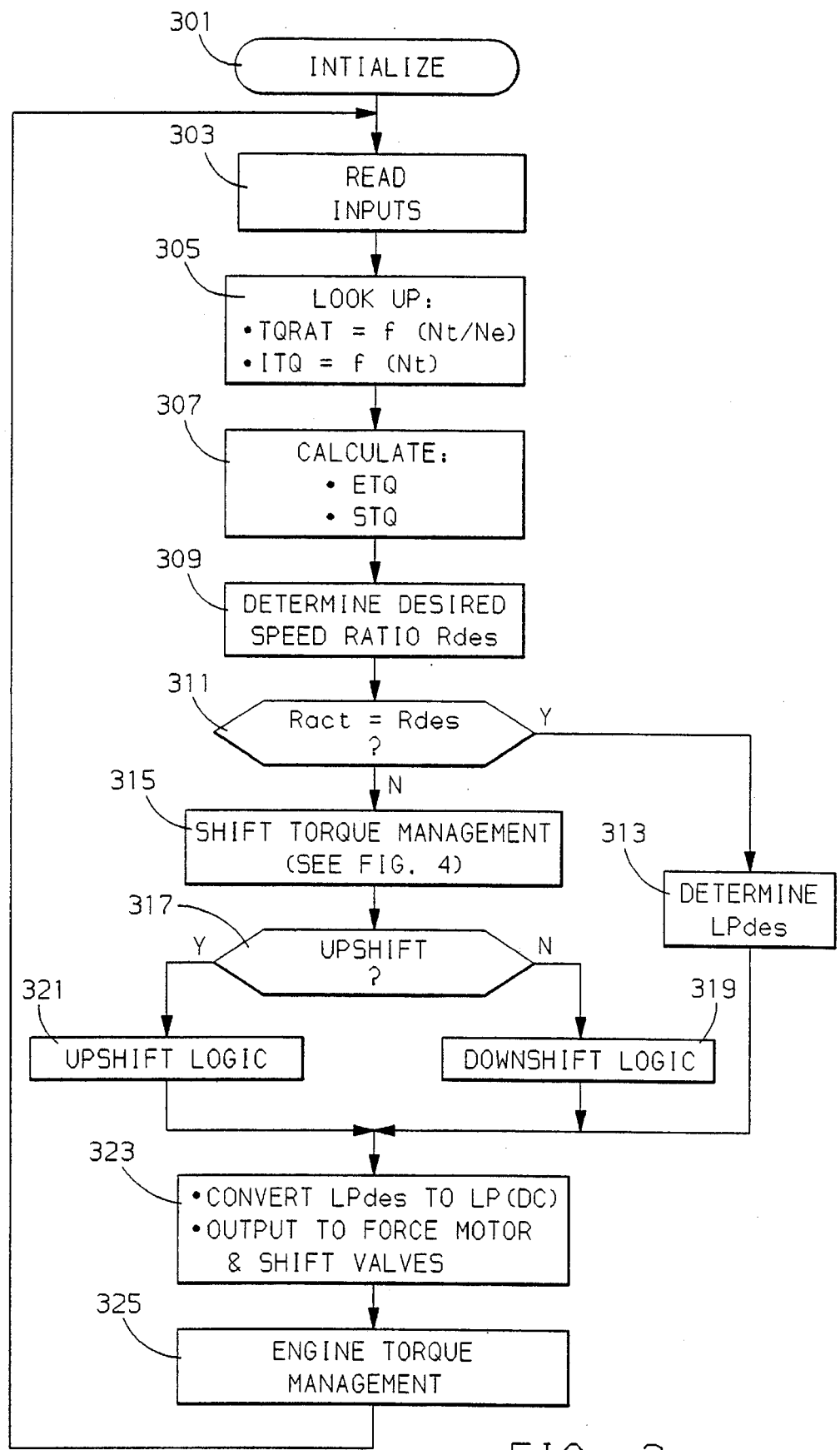
FIG. 3–4 illustrate various flow diagrams representing computer instruction sets executed by a powertrain control unit as illustrated in FIG. 1 for carrying out the shift torque control of the present invention.
Figure 4:
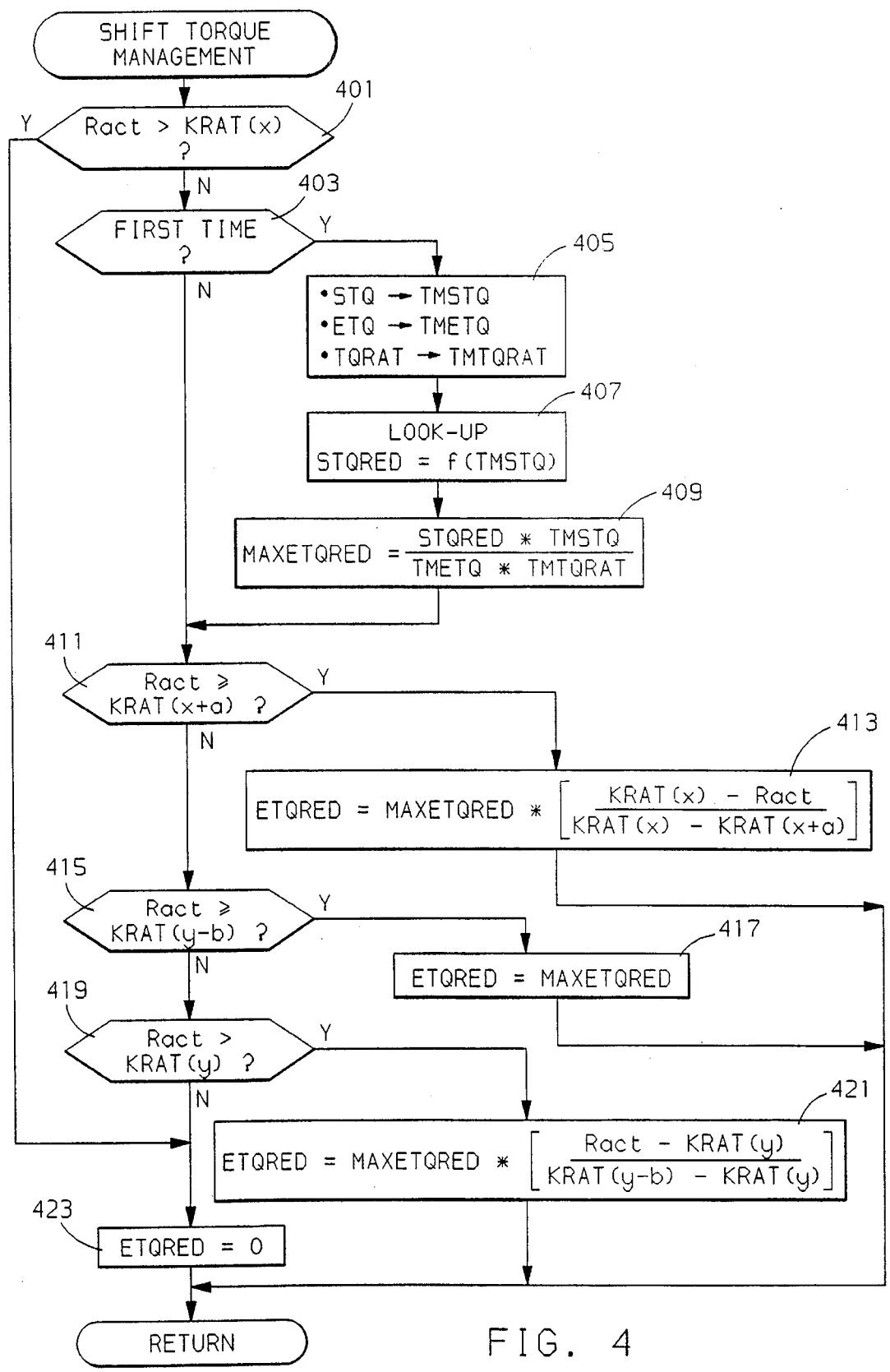

Referring now to the flow diagrams of FIGS. 3 and 4, a set of steps representative of program instructions executed by computer based powertrain control unit 42 for carrying out the present invention are illustrated. Beginning with the flow chart of FIG. 3, block 301 represents program instructions executed at the beginning of each period of vehicle operation for initializing various tables, timers, pointers etc. used in carrying out the control functions of the invention. Following such initialization, instruction blocks 303–325 are repeatedly executed as designated by the flow diagram. Block 303 reads and conditions various input signals applied to the powertrain control unit 42 via lines 46–56. Block 305 performs various calibration table look-ups including the engine torque gain TQRAT and ITQ. As mentioned earlier, TQRAT is determined as a function of the speed ratio across the torque converter (i.e. Nt/Ne). ITQ is determined as a function of Nt and is a signed variable meaning its contribution to the shift torque may be in either direction. Block 307 next calculates engine torque ETQ and shift torque TQ as previously described.

Block 309 determines the desired ratio, Rdes, in a conventional manner such as by vehicle speed versus throttle position tables. In transmission control, this is commonly referred to as shift pattern generation. If the actual ratio Ract is equal to Rdes, as determined at block 311, block 313 is executed to determine the desired line pressure LPdes for steady state operation of the vehicle. If Ract is not equal to Rdes, shifting is indicated and block 315 is executed to determine the appropriate engine torque reduction as described in detail with reference to FIG. 4. Blocks 317–321 are next executed to determine the desired line pressure LPdes in accordance with the shift torque STQ immediately prior to shift initiation for shifting as well as the timing of the required solenoid state changes. In any case, block 323 is then executed to convert the desired line pressure LPdes to a solenoid duty cycles LP(DC), and to output the duty cycle and discrete solenoid states to the shift valves on lines 57 as conventionally practiced in the art.

Block 325 is finally executed to develop a spark retard signals on line 40 for EST unit 38 for engine torque management and shift timing control during shifting. This may be accomplished for example by referencing a calibration table of percent engine torque reduction versus spark retard signal and outputting the spark retard signal on line 40.

Referring now to FIG. 4, a preferred shift torque management flow diagram generally referred to in the main loop instruction block 315 of FIG. 3 is set forth in detailed steps 401–423. The following description is given with respect to a ratio change from one ratio to a lower ratio (upshift); however, it is to be understood that the method embodied in the flow diagram is applicable to downshifts as well with appropriate modification of the various variables, parameters and operations detailed below. On entering the flow diagram, decision block 401 is first encountered whereat a determination is made as to whether the ratio change has begun. As earlier described, the actual ratio Nt/No as represented in Ract is compared to a threshold value related to the first ratio RAT(x). Here, a calibrated constant KRAT(x) such as 90% of the ratio RAT(x) provides a threshold through which as the ratio change progresses invokes steps 403–423 for engine torque reduction. Until Ract reaches the value KRAT(x), engine torque reduction steps are bypassed and block 423 is executed to set an engine torque reduction term ETQRED to zero.

Assuming ratio progression through KRAT(x), steps 405–409 are executed on the first instance through the loop as indicated by an affirmative response to block 403. Step 405 stores various quantities into torque management working variables (TMx). The final value of shift torque STQ prior to the shift start is saved as torque management shift torque (TMSTQ). Likewise, final values of engine torque ETQ and engine torque gain TQRAT are saved in torque management values TMETQ and TMTQRAT, respectively. Block 407 performs a look-up from a calibration table of a predetermined target shift torque reduction (STQRED) as a function of the shift torque present at the initiation of the ratio change. STQRED preferably is in the form of a percentage of the shift torque; however, STQRED alternatively may be in the form of a torque value.

Block 409 now performs the critical steps of accounting for the proportional constituents of the shift torque in calculating the percent engine torque reduction. The calculation is set up to return a maximum engine torque reduction expressed as a percent of engine torque (MAXETQRED). This may be accomplished in a couple alternative ways depending upon the form that STQRED takes (i.e. percent of shift torque or torque value). In the first case where STQRED is expressed as a percent of shift torque, STQRED is multiplied by the ratio of total shift torque (TMSTQ) to input torque (TMETQ*TMTQRAT). Conceptually, this ratio is equivalent to the inverse of input torque to total shift torque. In other words, as the input torque fractional contribution to a given total shift torque increases, the engine torque reduction (as a percentage of engine torque) necessary to effectuate the target shift torque reduction STQRED decreases, and vice-versa. In the second case where STQRED is expressed as a torque value, STQRED is merely divided by the input torque (TMETQ*TMTQRAT) to arrive at the percent engine torque reduction.

Blocks 411–423 are next executed after block 409 establishes MAXETQRED and in all subsequent passes through the present flow diagram for the present ratio change by virtue of a negative response at block 403. This portion of the flow diagram effectuate the ramp in and ramp out of the engine torque reduction as previously discussed. The ramp in is effectuated from a zero engine torque reduction term ETQRED=0 to the maximum engine torque reduction term ETQRED=MAXETQRED at blocks 411–413 at the beginning of the ratio change. The ramp out is effectuated from the maximum engine torque reduction term ETQRED=MAXETQRED to a zero engine torque reduction term ETQRED=0 at blocks 419–421 toward the end of the ratio change. Blocks 415–417 maintain the engine torque reduction at the maximum engine torque reduction during the portions of the ratio change therebetween.

Execution of block 411 determines if Ract is within a range of ratio progression appropriate for continued ramping and if so executes block 413. The range in the present embodiment is bounded by the calibrated constant KRAT(x) previously described and a calibrated constant KRAT(x+a) corresponding to a ratio forward of KRAT(x) in the shift progression. Block 413 establishes the engine torque reduction ETQRED in proportion to the ratio change progression through the range KRAT(x) to KRAT(x+a) by multiplication of MAXETQRED with a fractional completion term shown in brackets. The completion term progresses from zero to one as the Ract progresses from KRAT(x) to KRAT(x+a). Thereafter Ract reaching KRAT(x+a), block 411 is answered negatively and processing passes to block 415.

Execution of block 415 now determines if Ract is within a range of ratio progression appropriate for full application of the maximum engine torque reduction MAXETQRED and if so executes block 417. The range in the present embodiment is bounded by the calibrated constant KRAT(x+a) previously described and a calibrated constant KRAT(y-b) corresponding to a ratio prior to the end of the shift at which ramping out of the engine torque reduction is appropriate. Block 417 establishes the engine torque reduction ETQRED as MAXETQRED through the range KRAT(x+a) to KRAT(x-b). Thereafter Ract reaching KRAT(x-b), block 415 is answered negatively and processing passes to block 419.

Execution of block 419 determines if Ract is within a range of ratio progression appropriate for ramping out of the engine torque reduction and if so executes block 421. The range in the present embodiment is bounded by the calibrated constant KRAT(y-b) previously described and a calibrated constant KRAT(y) such as 110% of the ratio RAT(y).

Block 421 establishes the engine torque reduction ETQRED in proportion to the ratio change progression through the range KRAT(y-b) to KRAT(y) by multiplication of MAX-ETQRED with a fractional completion term shown in brackets that progresses from one to zero as the Ract progresses from KRAT(y-b) to KRAT(y). Thereafter Ract reaching KRAT(y), block 419 is answered negatively and processing passes to block 423 whereat the engine torque reduction is set to zero for the remainder of the shift.

We claim:

1. A method for controlling torque during a ratio change in a vehicular drivetrain, said drivetrain including an engine having an output member drivingly coupled to an input member of a multi-ratio transmission for providing an input torque thereto, said ratio change including transfer of a shift torque to an on-coming friction element of the transmission, the shift torque comprising the input torque and an inertia torque, the method comprising the steps:

calculating an uncorrected shift torque;

calculating the transmission input torque;

determining a shift torque reduction required to establish a predetermined target shift torque when applied to the uncorrected shift torque;

calculating a percent engine torque reduction as the ratio of the shift torque reduction to the transmission input torque; and, reducing the engine torque by the percent engine torque reduction to thereby establish a corrected shift torque substantially equivalent to the target shift torque.

2. A method for controlling torque during a ratio change in a vehicular drivetrain, said drivetrain including an engine having an output member drivingly coupled to an input member of a multi-ratio transmission for providing an input torque thereto, said ratio change including transfer of a shift torque to an on-coming friction element of the transmission, the shift torque comprising the input torque and an inertia torque, the method comprising the steps:

calculating an uncorrected shift torque;

calculating the transmission input torque;

determining a percent shift torque reduction required to establish a predetermined target shift torque when applied to the uncorrected shift torque;

calculating a percent shift torque reduction gain as a ratio of the uncorrected shift torque to the transmission input torque;

applying the shift torque reduction gain to the percent shift torque reduction to thereby establish a percent engine torque reduction; and reducing the engine torque by the percent engine torque reduction to thereby establish a corrected shift torque substantially equivalent to the target shift torque.

3. A method as claimed in claim 2 wherein said drivetrain further includes a torque converter interposed between the engine output member and the input member of the transmission, the step of calculating the transmission input torque comprising:

calculating an engine output torque;

measuring the torque converter speed ratio and determining therefrom an engine torque gain; and applying the engine torque gain to the engine output torque to thereby establish the transmission input torque.

4. A method as claimed in claim 2 wherein the percent engine torque reduction is ramped in from the start of the ratio change.

5. A method as claimed in claim 2 wherein the percent engine torque reduction is applied as a function of ratio change progression.

* * * * *